United States Patent

Niedecker

[11] 4,345,411
[45] Aug. 24, 1982

[54] APPARATUS FOR TRANSFERRING SAUSAGE HANGER LOOPS INTO A CLOSING MACHINE

[76] Inventor: Herbert Niedecker, Am Ellerhang 8, D 6240 Königstein 2, Fed. Rep. of Germany

[21] Appl. No.: 213,783

[22] Filed: Dec. 8, 1980

[30] Foreign Application Priority Data

Dec. 15, 1979 [DE] Fed. Rep. of Germany ....... 2950603

[51] Int. Cl.³ ............................................ B65B 61/14
[52] U.S. Cl. .................................. 53/134; 53/138 A; 493/226; 493/385; 493/926; 29/243.56
[58] Field of Search .................... 53/413, 134, 138 A; 493/375, 376, 385, 926, 226; 29/243.56, 243.57, 788; 17/44.2, 44.4

[56] References Cited

U.S. PATENT DOCUMENTS

3,483,801 12/1969 Kupcikevicius ................... 493/226
4,044,450 8/1977 Raudys ............................ 53/138 A
4,165,593 8/1979 Niedecker ....................... 53/138 A

FOREIGN PATENT DOCUMENTS

2414466 10/1975 Fed. Rep. of Germany ........ 53/134
2803511 8/1979 Fed. Rep. of Germany ........ 53/134

Primary Examiner—John Sipos
Attorney, Agent, or Firm—Sprung, Horn, Kramer & Woods

[57] ABSTRACT

In an apparatus for closing about the mouth of a filled sausage casing a closure clip 8 having two legs, the apparatus including a plate 1 provided with a clip guideway 6,7, means on the plate for gathering the casing 2,3, a closure die 17, a punch 9 for advancing a clip through the guideway about the gathered casing and against the die to cause the clip to be closed about the casing, and means 16 for introducing a loop 15 of flexible material so that the loop is locked to the sausage casing by the closure of the clip, whereby the sausage may be hung by the loop, the improvement wherein said loop introducing means comprises means for forming loops from a length of flexible material, and holder means 14 for successively engaging each loop and operatively associated with the punch so as to advance the loop as the punch and clip advance and to bring the loop into such position intercepting the guideway that one leg of the clip passes through the loop, whereupon the holder means is retracted and the clip proceeds to closure.

3 Claims, 9 Drawing Figures

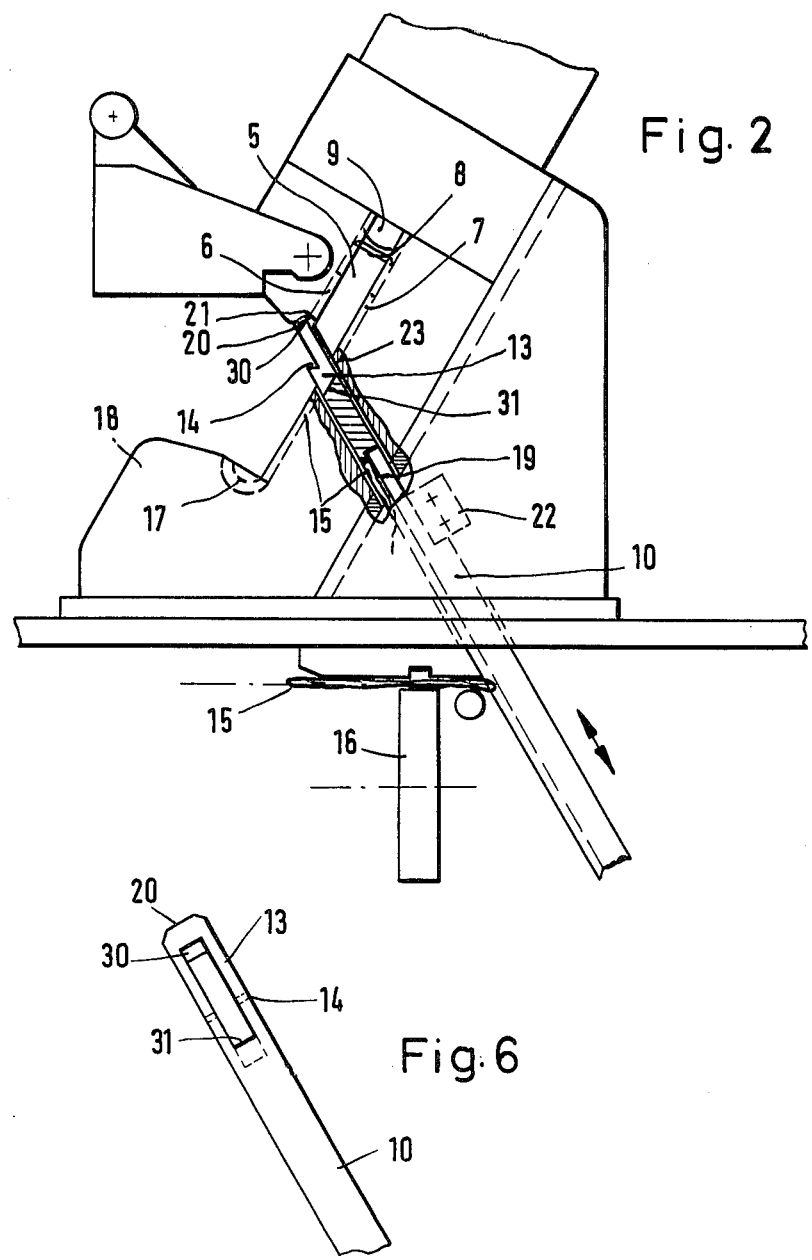

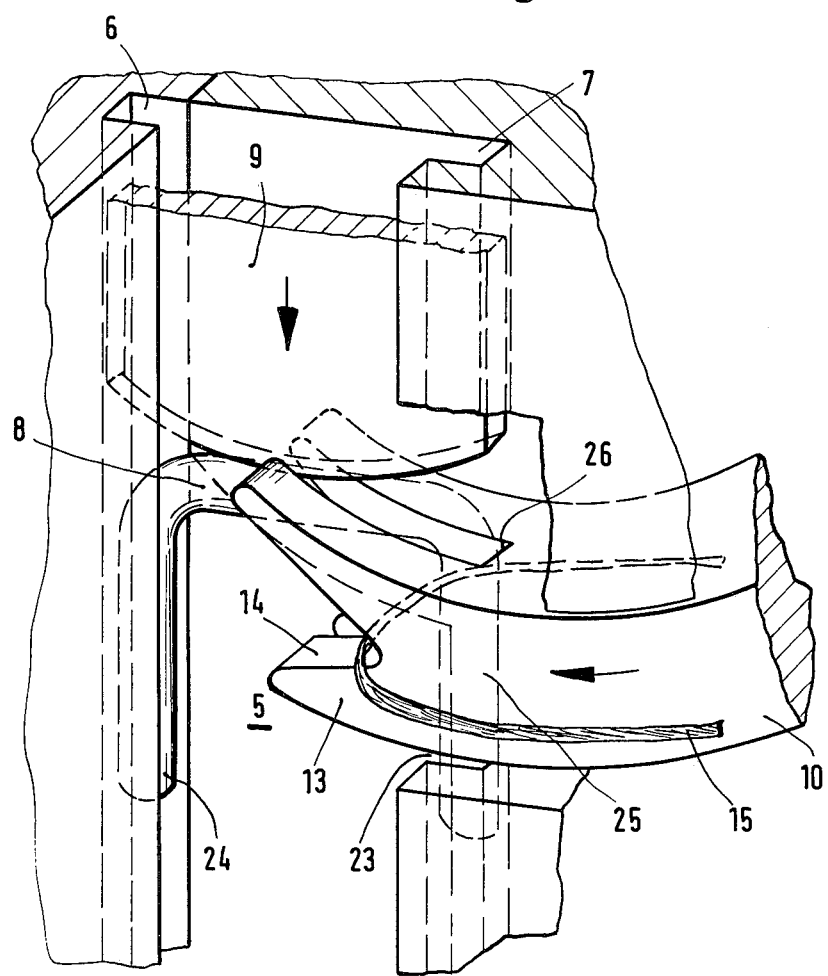

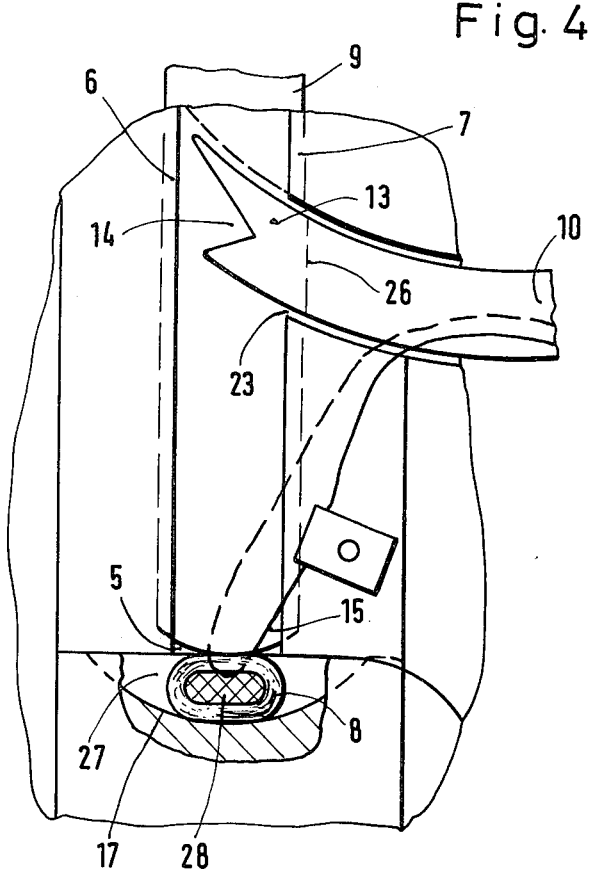
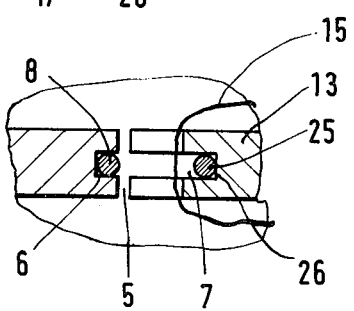

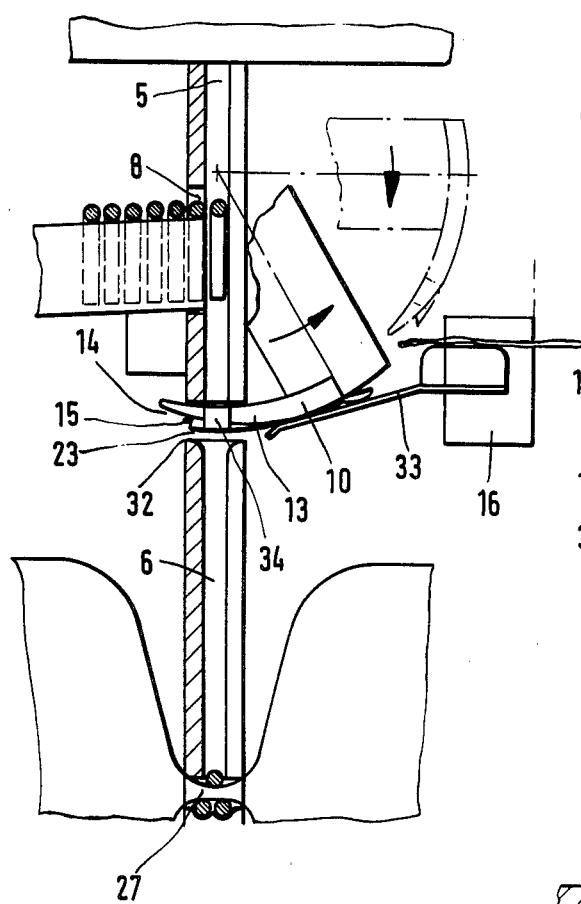
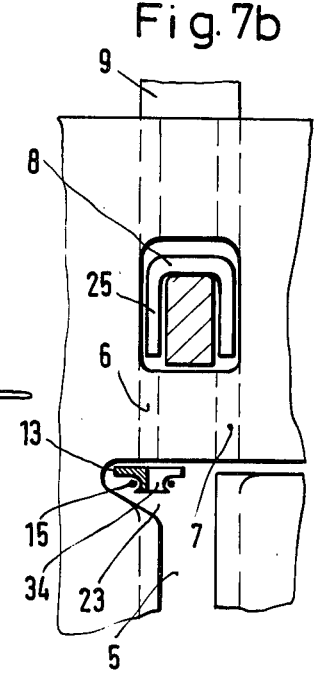
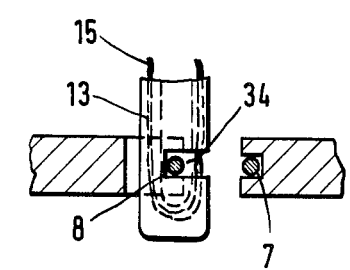

APPARATUS FOR TRANSFERRING SAUSAGE HANGER LOOPS INTO A CLOSING MACHINE

This invention relates to apparatus for feeding and transferring sausage hanger loops into a guideway for a U-shaped closing clip, which is singly fed to a closing station in a closing machine.

It is known to place prefabricated hanger loops into the closing device or closing clip. Apparatus for an automatic feeding of hanger loops has been provided (German Early Disclosure No. 25 39 821) in order to avoid the disadvantages involved in the manual insertion of loops. That apparatus has been developed for automatic closing machines and is not suitable for closing machines in which the closing clips are singly fed to the closing station.

U.S. Pat. No. 4,165,593 describes a process and apparatus for attaching a hanger loop to a tubular casing section; in that case the loop is made directly at the closing device. Owing to the high expenditure involved and the space required at the closing station, that apparatus too cannot be used in the closing machine under discussion here.

German Early Disclosure No. 28 03 511 describes apparatus for presenting a hanger loop for use in a machine for closing sausage casings. In that apparatus, the double cord sewn together at its ends is pushed into the opened closing flap of a closing machine and together with the closing clip is applied to the sausage end. In that case the loop is not engaged by the leg of the clip and can slip out under higher load. From German Early Disclosure No. 24 14 466 it is known to provide sausage hangers which consist of prefabricated, dimensionally stable loops of plastic material and which by means of an automatic or hand-operated feeder for individual plastic loops are applied to the end of a sausage casing in such a manner that the closing clip fixes the leg portion of the plastic loop to the sausage casing as the latter is closed. Sausage hanger loops made of plastic material, i.e., a hanger cord, cannot be fed to the closing station by this apparatus. Besides, that apparatus cannot be used to feed the sausage hanger loop in such a manner that the closing clip engages only the open loop only on one side although this would be desirable for an improved fixation of the loop to the end of the sausage casing.

For this reason it is an object to provide apparatus which is intended for use with closing machines for feeding single closing clips to the closing station and in which sausage hanger loops consisting of flexible material, i.e., a cord, are fed in a manner which meets present-day requirements as regards automation and which accomplishes that object as simply as possible and in which the loop is engaged only on one side so that the loop cannot slip out of the closing clip.

That object is accomplished in that, in an apparatus that is of the kind described first hereinbefore and has a pusher for advancing the loop, the end portion of the pusher in its transfer position protrudes into the guideway through a gap in at least one guide passage for one leg of the closing clip and the feeding of a loop of flexible material into the guide passage and the engaging of the open loop only on one side by a leg of the closing clip are ensured in that the end portion of the pusher is provided with a holder for receiving the loop.

The end portion of the pusher in the transfer position may define a portion of the guide passage for at least one leg of the closing clip. The end portion of the pusher may be forked and in the transfer position may protrude into the guideway of the closing clip so that the bight of the forked end defines a portion of the guide passage for one leg of the closing clip.

A curved, pivoted pusher or a straight, displaceable pusher receives in its holder a prefabricated hanger loop and introduces it into the guideway for the closing clip as remotely as possible from the closing station in such a manner that the leg of the U-shaped closing clip engages the open hanger loop on one side and carries it along to the closing station. That holder of the pusher will reliably engage the cord. The pusher is moved as far as to an end stop and supplements the guide passage, which is interrupted at this point.

In another suitable embodiment the pusher extends at an angle of 90° to the plane in which the clip is guided so that the pusher introduces the loop at right angles to the closing plate. In that case too the pusher is turned in or is guided along a straight line at an angle.

Embodiments of the apparatus according to the invention will be explained more fully with reference to the accompanying drawings wherein:

FIG. 2 is an elevation showing a closing machine and shows in section a straight pusher guide and a holder;

FIG. 3 is a perspective view showing a gap in the guide passage of a closing machine and the end portion of the forked driver as well as a holder;

FIG. 4 is a fragmentary view showing the transfer station with the end portion of the driver, the holder for the loop, and the closing punch, which is in closing position;

FIG. 5 is a sectional view showing the end portion of the pusher, provided with a holder for the loop, as well as the guide passage and the closing clip;

FIG. 6 is a top plan view showing the end portion of a straight pusher and a closing clip guide;

FIG. 7a is a longitudinal sectional view showing a guide passage and shows in elevation a pusher which is in transfer position and a gap in an orientation differing by 90°;

FIG. 7b shows a portion of a guide passage provided with a breakthrough for the end portion of the pusher;

FIG. 7c is a sectional view showing the guide passage and in a top plan view shows the end portion of the pusher.

Figure 1:
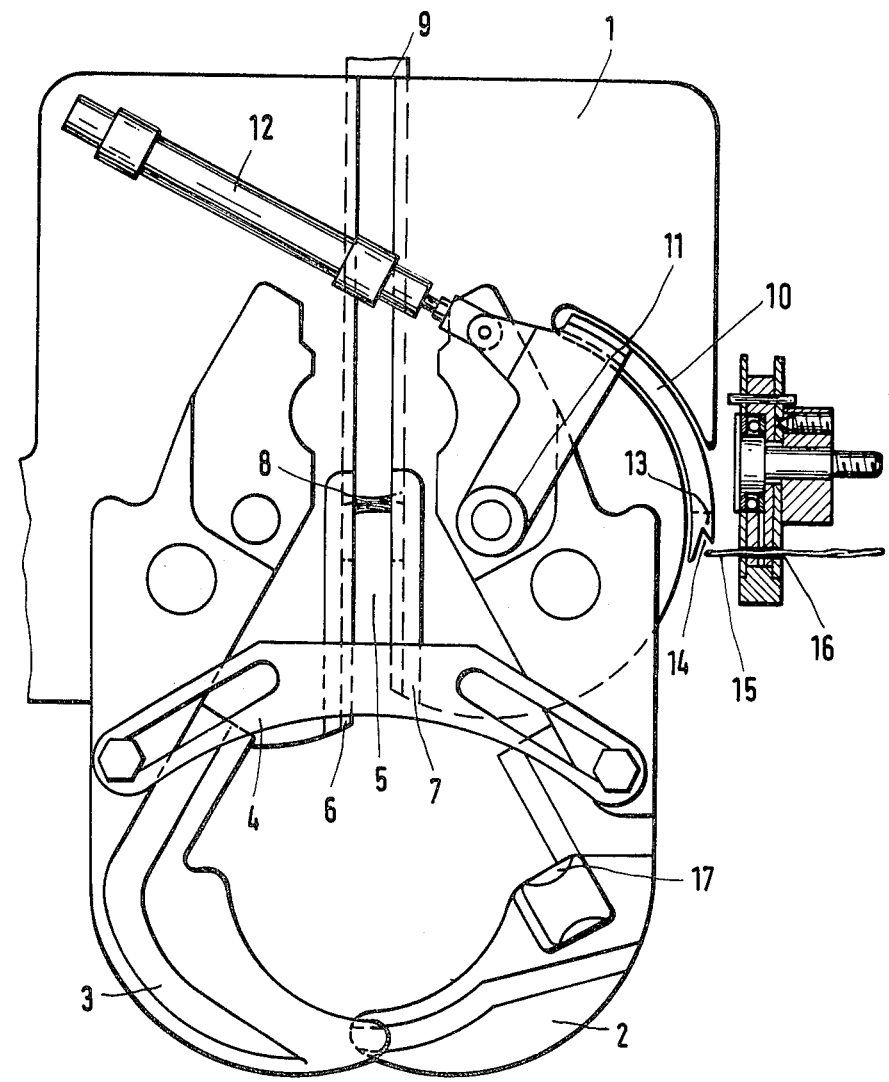
FIG. 1 is an elevation showing a portion of a closing head comprising a pusher and a holder for receiving the loop.

The reference characters apply to all figures.

FIG. 1 is an elevation showing a portion of the closing head of a closing machine preferably intended for thick sausages. The displacing shears 2 and 3 and the pre-gathering device 4 are attached to a mounting plate 1.

The mounting plate 1 is formed with a guideway 5 comprising two mutually opposite guide passages 6 and 7, in which the legs of the closing clip 8 are guided as they are advanced by the punch 9. The curved pusher 10 is pivoted at 11 in the mounting plate 1 or in the machine frame, not shown, and is swung forth and back by a drive 12. The end portion 13 of the pusher 10 is provided with a holder 14 for receiving the loop 15. Moving toward the guideway 5, the pusher 10 engages the loop 15, which may be attached to a belt and is moved by a feeder and former 16 to the delivery position. The displacement shears 2 is provided with a die 17, which cooperates with the punch 9 to close the closing clip 8.

FIG. 2 shows another embodiment of the invention with a straight driver, for instance, for use in a bench top closing apparatus 18. The pusher 10' has an additional guide 19. In this case, the movement of the pusher 10' is limited in that its end edge 20 engages a stop 21 when the pusher forms a portion of the guideway 5, which is interrupted at 23. Alternatively, a stop 22 (indicated in phantom) may be provided, e.g., at another point of the pusher 10'. The surfaces of the guideway 5 for the pusher 10' are designated 30, 31 in FIG. 6.

FIG. 3 is a perspective view showing the gap 23 formed in the guideway 5 comprising the guide passages 6 and 7, in which the legs 24 and 25 of the closing clip 8 are slidably mounted. When the end portion 13 of the pusher 10 is in the transfer position shown on the drawing, the loop 15 lies in the holder 14 formed by the forked end portion 13 of the pusher.

The bight 26 of the forked end portion 13 constitutes a portion of the guide passage 7, which is interrupted at 23. The leg 25 of the clip 8 has engaged the loop 15.

FIG. 4 shows how the end portion 13 of the pusher 10 in its transfer position protrudes through the gap 23 into the guideway 5 for the clip 8. The forked bight 26 constitutes a portion of the interrupted guide passage 7. The leg 25 of the clip 8 has engaged the loop 15 and has pulled it out of the holder 14, and the punch 9 is driving the clip 8 to the closing station 27. The punch 9 and die 17 have closed the clip 8 in the shape of a ring and have thus applied it around the end 28 of the tubular casing and have caused the clip to enclose also the loop 15.

FIG. 5 is a sectional view showing the interrupted guideway 5 and the end portion 13 of the pusher 10 before the loop 15 is received by the clip 8. The loop 15 lies in the recess 14 formed in the one portion 13 of the pusher 10.

FIG. 6 is a top plan view showing the one portion 13 of the pusher 10 in FIG. 2. In this case the end portion 13 is closed so that the surfaces 30 and 31 constitute a portion of the guideway 5.

FIGS. 7a to 7c show a pusher 10 in a different relation to the guideway 5 of a closing machine. In this case the pusher 10 enters the guideway 5 in an orientation differing by 90° so that the end portion 13 of the pusher 10 may be flat.

FIG. 7a is a sectional view showing the guideway 5 and shows in elevation the guide passage 6, which is interrupted at 32. As the movement of the pusher 10 is initiated, the loop 15 is picked up from the loop feeder 16 by the holder 14 provided in the end portion 13 of the pusher. There is a loop guide 33, which retains the loop 15 in the holder 14 until the loop is engaged and carried along by the leg of the clip 8 moving toward the closing station 27.

FIG. 7b shows the interrupted guide passage 6 of the guideway 5 and in a sectional view shows the end portion 13. Because the gap 23 in the guide passage 6 is short, the leg 25 of the clip 8 need not be guided in the end portion 13 of the pusher 10. During their closing movement, the clip 8 and the punch 9 move through a recess 34 in the end portion 13 of the pusher 10. FIG. 7c is a sectional view related to FIG. 7b and in a top plan view shows the end portion 13 of the pusher 10. In this case the recess 34 through which the clip 8 and punch 9 are moved is somewhat larger and need not serve to guide the clip.

It will be appreciated that the instant specification and examples are set forth by way of illustration and not limitation, and that various modifications and changes may be made without departing from the spirit and scope of the present invention.

I claim:

1. In an apparatus for closing about the mouth of a filled sausage casing a closure clip having two legs, the apparatus including a plate provided with a clip guideway, means on the plate for gathering the casing, a closure die, a punch for advancing a clip through the guideway about the gathered casing and against the die to cause the clip to be closed about the casing, and means for introducing a loop of flexible material having two connected side portions so that the loop is locked to the sausage casing by the closure of the clip, whereby the sausage may be hung by the loop, the improvement wherein said loop introducing means comprises means for forming loops from a length of flexible material, and pusher means for successively engaging each loop, means operatively associated with the punch for moving said pusher so as to advance the loop as the punch and clip advance and to bring the loop into such position intercepting the guideway that one leg of the clip moved by the punch passes between said side portions and through the loop, whereupon the pusher means is retracted and the clip proceeds to closure.

2. An apparatus according to claim 1, wherein the forward end of the pusher is grooved so that in the transfer position where the leg of the clip passes through the loop held by the pusher the groove is aligned with the guideway.

3. An apparatus according to claim 2, wherein the forward end of the pusher is forked and in its transfer position extends into the guideway for the clip so that the bight of the forked end defines a portion of the guide passage for one leg of the closing clip.

* * * * *